Patented Nov. 20, 1945

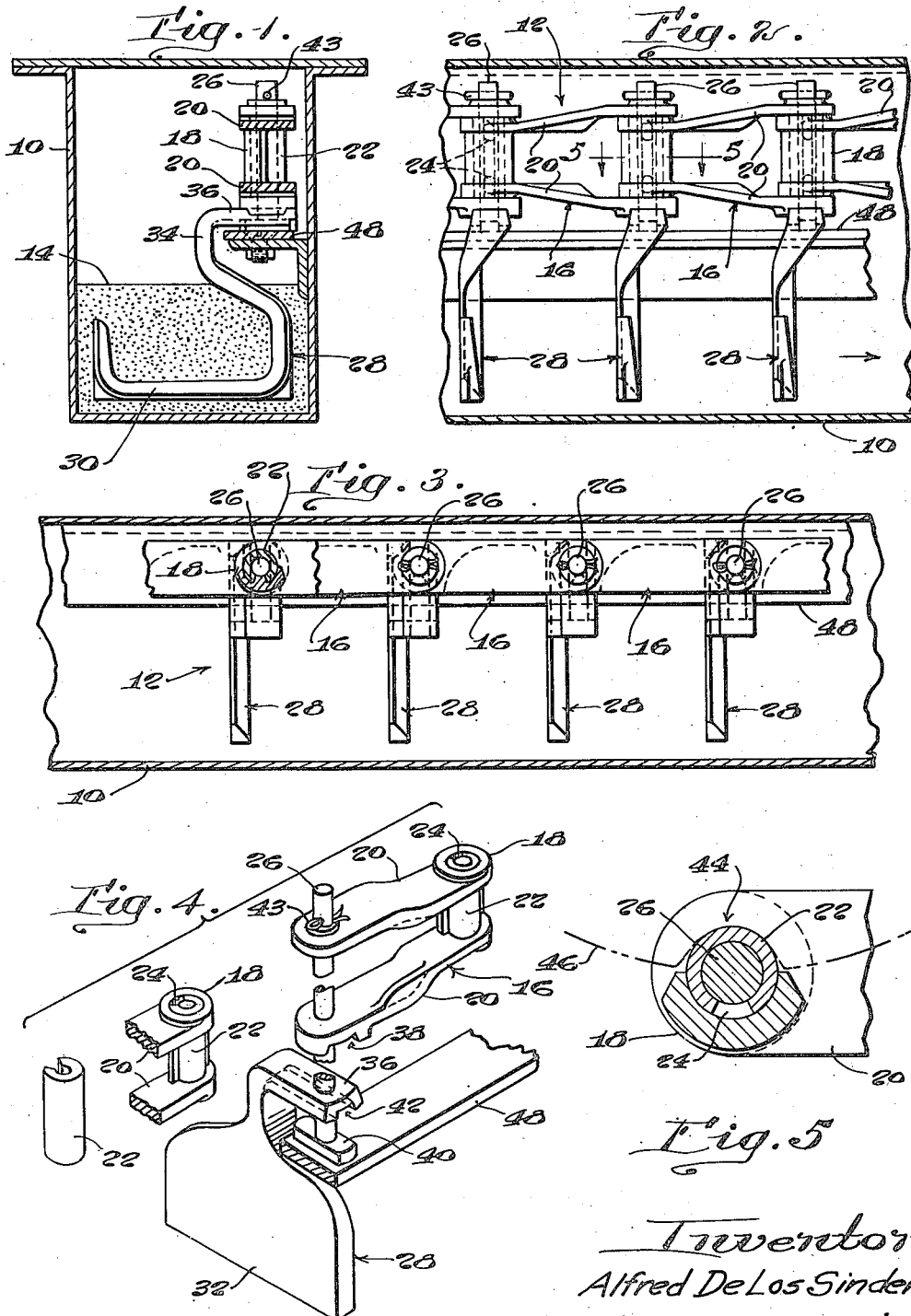

2,389,279

UNITED STATES PATENT OFFICE 2,389,279

CONVEYER

Alfred De Los Sinden, Aurora, Ill., assignor to Redler Conveyor Company, Quincy, Mass., a corporation of Massachusetts Application July 27, 1944, Serial No. 546,809

7 Claims. (Cl. 198—176)

This invention relates to a conveyer and to conveying element for conveying flowable solid material.

The invention has for a general object to provide a conveyer for conveying flowable solid material of novel and improved construction, which may be economically manufactured, wherein flight members may be readily detached for replacement or repair, and which is capable of withstanding more conditions of use for long periods of time.

With this general object in view and such others as may hereinafter appear, the invention consists in the conveyer, in the conveying element and in the various structures, arrangements and combinations of parts hereinafter described and particularly defined in the claims at the end of this specification.

In the drawing illustrating the preferred embodiment of the invention, Fig. 1 is a cross-sectional view of a conveyer embodying the present invention; Fig. 2 is a side elevation of the conveyer as viewed from the left of Fig. 1, the conveyer casing being shown in cross section; Fig. 3 is a plan view of the same; Fig. 4 is a perspective view of the conveying element embodying the invention showing the parts disconnected for sake of clearness and illustrating a flight of the solid type; and Fig. 5 is an enlarged cross-sectional view taken on the line 5—5 of Fig. 2, to be referred to.

In general present conveyers for conveying flowable solid material having usually embodied a casing and a conveying element drawn therethrough. The conveying element has been provided with spaced flights of the open or closed type and experience has demonstrated that the conveying elements as heretofore constructed have not possessed the durability desired when subjected to severe conditions of use.

The present conveyer embodies a casing and a conveying element mounted to be drawn therethrough. The conveying element is of novel structure wherein provision is made for detachably connecting the flight members to individual tension elements or connecting arms of the chain link type and such structure lends itself to the provision of hardened bearing surfaces at all points of wear of the links including the pivotal bearings, such portions thereof as may engage the casing, and also the portions engaged by the driving element whereby to increase the life of the conveying element and to reduce wear to a minimum, particularly under severe conditions of use. The conveying element preferably embodies a conveying flight adapted to be detachably connected to a chain link type of tension element in a novel simple and convenient manner and whose structure is such as to provide a more evenly balanced flight whereby to prevent overbalancing or tipping thereof and consequent dragging of the lower portions of the flight against the bottom of the casing.

Referring now to the drawing, as therein illustrated, the conveyer includes a casing or trough 10 which may extend in a general rectangular and horizontal path, and a conveying element 12 mounted to be moved therethrough to effect conveyance of solid flowable material 14 through the casing preferably in a continuous stream.

The illustrated conveying element 12 comprises a plurality of pivotally connected tension elements comprising chain links 16, each having a hub 18 and spaced parallel arms 20 extending from the hub and adapted to embrace the ends of the hub of an adjacent link. Each hub 18 is provided with a hardened split bushing 22 having its ends flush with the ends of the hub, and, in order to prevent rotation of the bushing with relation to the hub a pair of spaced lugs 24 formed integrally with and extending from the inner wall of the hub are provided against which the longitudinal edges of the split bushing are arranged to engage to key the bushing in the hub. The chain links are pivotally connected together by elongated hardened pins 26 which extend through the bushing 22 and the ends of the arms 20 of adjacent links, provision also being made for attaching a flight member 28 to the lower end of each pivotal connection as will be hereinafter described.

As herein illustrated the conveying element is arranged to run longitudinally through the casing with the pivotal axes of the chain links disposed vertically, that is, with the links standing on edge and the flight members 28 are connected to the chain links in a manner such as to extend transversely of the casing 10 at right angles to the chain. The flight members may be either of open structure as indicated at 30 in Fig. 1 or of closed structure as indicated at 32 in Fig. 4, the pivotal connection of the links and manner of attachment of the flights thereto being the same in either case.

As best shown in Fig. 4 each flight is provided with a connecting portion comprising an arm 34 extending vertically from substantially the center of the flight and having a horizontally extended portion 36, the latter being provided with an opening through which the connecting pin 26 extends to attach the flight to the chain link. In order to maintain the flight at right angles to the chain link the upper portion of the horizontally extended arm 36 comprises a tongue adapted to fit in a groove 38 formed in the underside of the lower of arms 20 of the link, and as herein shown, the tongue may be provided with tapered edges to fit in the correspondingly tapered walls of the groove 38. The connecting pin 26 is provided at its lower end with a T-shaped head 40 arranged to extend into a groove 42 formed in the underside of the horizontally extended arm 36 whereby to prevent relative rotation between the flight and the pin. The other end of the pin 26 is provided with a cotter 43 to hold the parts in assembled relation.

From the description thus far it will be observed that the present conveying element is provided with spaced flights adapted to be detachably connected to a tension element of the chain link type and in which the pivotal connection comprises hardened elements held from rotation in their respective ends of the links in which they are supported so that all the pivotal wear occurs between the hardened elements to provide an efficient and long wearing unit. The conveying element is preferably driven by a sprocket adapted to engage the hub portions of successive links and, as best shown in Figs. 4 and 5, each hub 18 is cut away at the sprocket engaging portions as indicated at 44 to expose a part of the exterior of the bushing 22 in order to provide a hardened bearing surface for engagement by a driving sprocket 46, as shown in dotted lines in Fig. 5, thus reducing the wear at this point to a minimum.

For most efficient operation of the conveyer the marginal edges of the transversely extended flights 28 are preferably spaced a suitable distance from the side and bottom walls of the casing to effect a smooth flow of the material. In order to dispose the flights in the conveyer to maintain such spacing the conveying element may and preferably will be supported in the casing by an elongated rail or track 48 disposed within the confines of the casing and above the level of the material therein. In order to reduce the wear of the portions of the conveying element in sliding contact with the rail, the hardened head 40 of the pin 26 extends below the groove 42 to form the sole engaging portion of the conveying element with the rail. As herein shown, the T-shaped head 40 extends transversely of the rail to form a relatively wide supporting area, such structure being conducive to provide a more evenly balanced flight less subject to tilting in the casing and the consequent dragging of the flights against the side and bottom walls thereof.

From the above description it will be observed that the present invention enables the flight members to be detachably connected with a tension element of the chain link type in a novel and efficient manner, and, that the structure is such as to substantially increase the life of the conveying element and to reduce wear to a minimum.

While the preferred embodiment of the invention has been herein illustrated and described, it will be understood that the invention may be embodied in other forms within the scope of the following claims.

Having thus described the invention, what is claimed is:

1. A conveying element comprising a tension element including a plurality of pivotally connected chain links each having a hub and a pair of spaced arms adapted to embrace the ends of the hub of an adjacent link, one of said arms having a groove, a plurality of individual spaced conveying flights connected to said links, each flight having a connecting arm forming a tongue adapted to be received in said groove formed in one arm of each link, and a plurality of pins pivotally connecting said links and detachably retaining the parts in assembled relation.

2. A conveying element comprising a tension element including a plurality of pivotally connected chain links each having a hub and a pair of spaced arms adapted to embrace the ends of the hub of an adjacent link, one of said arms having a groove, a plurality of individual spaced conveying flights connected to said links, each flight having a connecting arm forming a tongue adapted to be received in said groove formed in one arm of each link, and a plurality of pins pivotally connecting said links and detachably retaining the parts in assembled relation, each of said pins having a head adapted to be received in a groove formed in said connecting arm to prevent rotation of the pin with relation to the flight.

3. A conveying element comprising a tension element including a plurality of pivotally connected chain links each having a hub and a pair of spaced arms adapted to embrace the ends of the hub of an adjacent link, one of said arms having a groove, a plurality of individual spaced conveying flights connected to said links, each flight having a connecting arm forming a tongue adapted to be received in said groove formed in one arm of each link, and a plurality of pins pivotally connecting said links and detachably retaining the parts in assembled relation, each of said hubs having a bushing through which said pins extend and means for preventing rotation of the bushing with relation to the hub.

4. A conveying element comprising a tension element including a plurality of pivotally connected chain links each having a hub and a pair of spaced arms adapted to embrace the ends of the hub of an adjacent link, one of said arms having a groove, a plurality of individual spaced conveying flights connected to said links, each flight having a connecting arm forming a tongue adapted to be received in said groove formed in one arm of each link, and a plurality of pins pivotally connecting said links and detachably retaining the parts in assembled relation, each of said pins having a head adapted to be received in a groove formed in said connecting arm to prevent rotation of the pin with relation to the flight, each of said hubs having a bushing through which said pins extend and means for preventing rotation of the bushing with relation to the hub.

5. For use in a conveyer for conveying flowable solid materials of the type having a casing provided with a track therein for supporting the conveying element as it is drawn through the casing, a conveying element comprising a tension element including a plurality of pivotally connected chain links each having a hub and a pair of spaced arms adapted to embrace the hub of an adjacent link, hardened elements carried by said links and positioned to comprise the sole engaging portion of the conveying element with the track, and a plurality of transversely extended spaced flight members connected to said links.

6. For use in a conveyer for conveying flowable solid materials of the type having a casing provided with a track therein for supporting the conveying element as it is drawn through the casing, a conveying element comprising a tension element including a plurality of pivotally connected chain links, a plurality of pins pivotally connecting said chain links, said pins having hardened heads forming a sole point of engagement with the track, and a plurality of transversely extended flights connected to said links.

7. For use in a conveyer for conveying flowable solid materials of the type having a casing provided with a track therein for supporting the conveying element as it is drawn through the casing, a conveying element comprising a tension element including a plurality of pivotally connected chain links, a plurality of pins pivotally connecting said chain links and each having a transversely extended elongated head adapted for sliding engagement with said track, and a plurality of transversely extended conveyer flights connected to said links.

<div style="text-align: right;">ALFRED DE LOS SINDEN.</div>